United States Patent
Sheshadri et al.

(10) Patent No.: US 8,941,489 B2
(45) Date of Patent: Jan. 27, 2015

(54) METHOD AND/OR APPARATUS FOR GEOFENCE MANAGEMENT

(75) Inventors: Suhas H. Sheshadri, Santa Clara, CA (US); Aditya N. Srivastava, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 13/529,782

(22) Filed: Jun. 21, 2012

(65) Prior Publication Data

US 2013/0099977 A1 Apr. 25, 2013

Related U.S. Application Data (60) Provisional application No. 61/549,619, filed on Oct. 20, 2011.

(51) Int. Cl.
*G08B 1/08* (2006.01)

(52) U.S. Cl.
USPC ............ 340/539.13; 340/426.19; 340/309.16; 701/207

(58) Field of Classification Search
USPC ............. 340/539.13, 426.11, 426.19, 426.22, 340/576, 994, 552, 309.16, 309.7; 701/201, 701/202, 206, 207, 210, 211
See application file for complete search history.

(56) References Cited

U.S. PATENT DOCUMENTS

| | | | |
|---|---|---|---|
| 6,581,546 B1 | 6/2003 | Dalland et al. | |
| 7,164,986 B2* | 1/2007 | Humphries et al. | 701/517 |
| 7,755,472 B2* | 7/2010 | Grossman | 340/426.1 |
| 2003/0095046 A1* | 5/2003 | Borugian | 340/576 |
| 2005/0017855 A1* | 1/2005 | Harvey | 340/426.1 |
| 2007/0143013 A1 | 6/2007 | Breen | |
| 2007/0290840 A1* | 12/2007 | Ehrman et al. | 340/539.13 |
| 2010/0017126 A1 | 1/2010 | Holcman et al. | |
| 2010/0042940 A1 | 2/2010 | Monday et al. | |
| 2010/0094500 A1 | 4/2010 | Jin | |
| 2010/0127919 A1 | 5/2010 | Curran et al. | |
| 2011/0063138 A1 | 3/2011 | Berkobin et al. | |
| 2011/0148626 A1 | 6/2011 | Acevedo | |

FOREIGN PATENT DOCUMENTS

WO WO2008/051236 A2 5/2008

OTHER PUBLICATIONS

International Search Report and Written Opinion—PCT/US2012/057496—ISA/EPO—Feb. 5, 2013.

* cited by examiner

*Primary Examiner* — Hung T. Nguyen
(74) *Attorney, Agent, or Firm* — Berkeley Law & Technology Group, LLP (57) ABSTRACT

Disclosed are a system, method or device for maintaining a geofence to provide alerts in response to an object entering or exiting an area bounded by the geofence. In one example implementation, a geofence may be temporarily altered. In particular examples, such an alteration of a geofence may comprise changing a size or shape of the geofence.

28 Claims, 9 Drawing Sheets

METHOD AND/OR APPARATUS FOR GEOFENCE MANAGEMENT

This application claims the benefit of priority to U.S. Provisional Patent Application No. 61/549,619 for "Method and/or Apparatus for Geofence Management," filed on Oct. 20, 2011.

BACKGROUND

Satellite Positioning Systems ("SPS") and other positioning technologies have been used for locating persons, things, etc. by, for example, acquiring signals transmitted by transmitters located at fixed locations. In particular implementations, positioning technologies on a mobile device may obtain a "position fix" from time to time indicating an estimate of a location of the mobile device. In combination with position fixes obtained using positioning technologies, some location based applications employ a "geofence" bounding a region of interest to detect entries into or exits from the region of interest. A geofence may comprise a virtual perimeter on a geographic area using a location-based service, so that a notification may be generated in response to the monitored device entering or exiting the area. Detection of a geofence breach may involve monitoring the position of a mobile device and detecting events triggered by the monitored position crossing the geofence.

BRIEF DESCRIPTION OF THE FIGURES

Embodiments will now be described by way of non-limiting example with reference to the following figures. None of these drawings is intended to be proportional or to scale.

SUMMARY

In one example implementation, a method comprises: detecting a breach of a geofence in response to detection that a mobile device has entered or exited a region bounded by the geofence; temporarily altering said geofence from an initial state in response to said detection of said breach; and returning said geofence to said initial state responsive to expiration of a duration.

In another example implementation, a mobile device comprises: a receiver to acquire wireless signals; and a processor to: detect a breach of a geofence in response to detection that the mobile device has entered or exited a region bounded by the geofence based, at least in part, on said acquired signals; temporarily alter said geofence from an initial state in response to said detection of said breach; and return said geofence to said initial state responsive to expiration of a duration.

In another example implementation, an article comprises: a non-transitory storage medium comprising machine-readable instructions stored thereon which are executable by a special purpose computing apparatus to: detect a breach of a geofence in response to detection that the mobile device has entered or exited a region bounded by the geofence; temporarily alter said geofence from an initial state in response to said detection of said breach; and return said geofence to said initial state responsive to expiration of a duration.

In yet another example implementation, an apparatus comprises: means for detecting a breach of a geofence in response to detection that a mobile device has entered or exited a region bounded by the geofence; means for temporarily altering said geofence from an initial state in response to said detection of said breach; and means for returning said geofence to said initial state responsive to expiration of a duration.

It should be understood, however, that these are merely example implementations provided for the purpose of illustration, and that claimed subject matter is not limited by or to any particular example implementation described herein.

DETAILED DESCRIPTION

In particular applications of a geofence, if a tracked device travels along a geofence such that the device frequently crosses over the geofence (e.g., repeatedly entering and leaving an area bounded by the geofence), moving into and out of an area bounded by the geofence, the geofence may be deemed as being breached frequently. Frequent breaches may initiate an undesirable number of breach reports, which could consume transmission and power resources. Accordingly, unnecessarily frequent breach reports may diminish the utility of a geofence application for mobile devices with limited battery resources. In a particular implementation, frequent breaches of a geofence from hopping (e.g., from rapid crisscrossing the boundary of the geofence) may be addressed by manipulating the border or size of the geofence.

Geofence embodiments described herein may be directed to a circular shape. In other implementations, however, a geofence may have other shapes or no definite shape. If an object—such as a mobile device—was previously outside of a geofence and then enters an area bounded by the geofence, a breach event may be detected in response. The breach event may be reported and, for a duration of time 't', a size of the geofence (e.g., a radius of the geofence if having a circular shape) may be increased from 'r' to 'r+x'. This can similarly be applied in another scenario where the object first inside and then leaving the geofenced area. Here, if is first detected that the object has left the geofence, a breach event may be reported and for an interval of time 't', the radius of the geofence may be decreased from 'r' to 'r−x'. As pointed out below, by temporarily altering a geofence in response to a breach event, unnecessary breach reports may be reduced.

Figure 1:
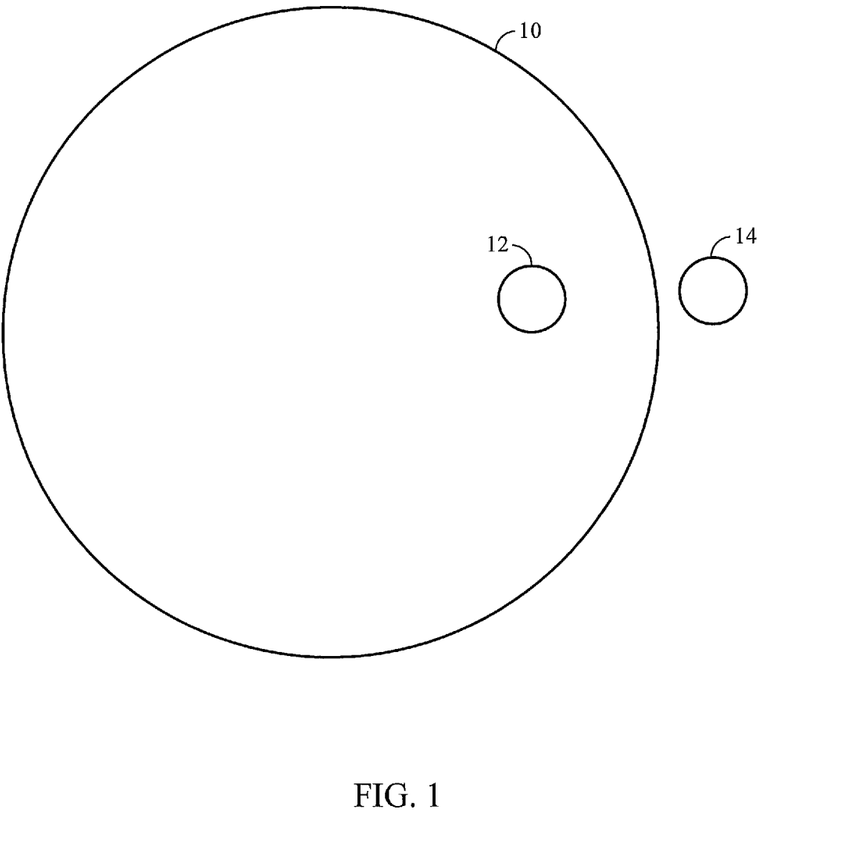
FIG. 1 is a diagram of a geofence according to an implementation.
Figure 2:
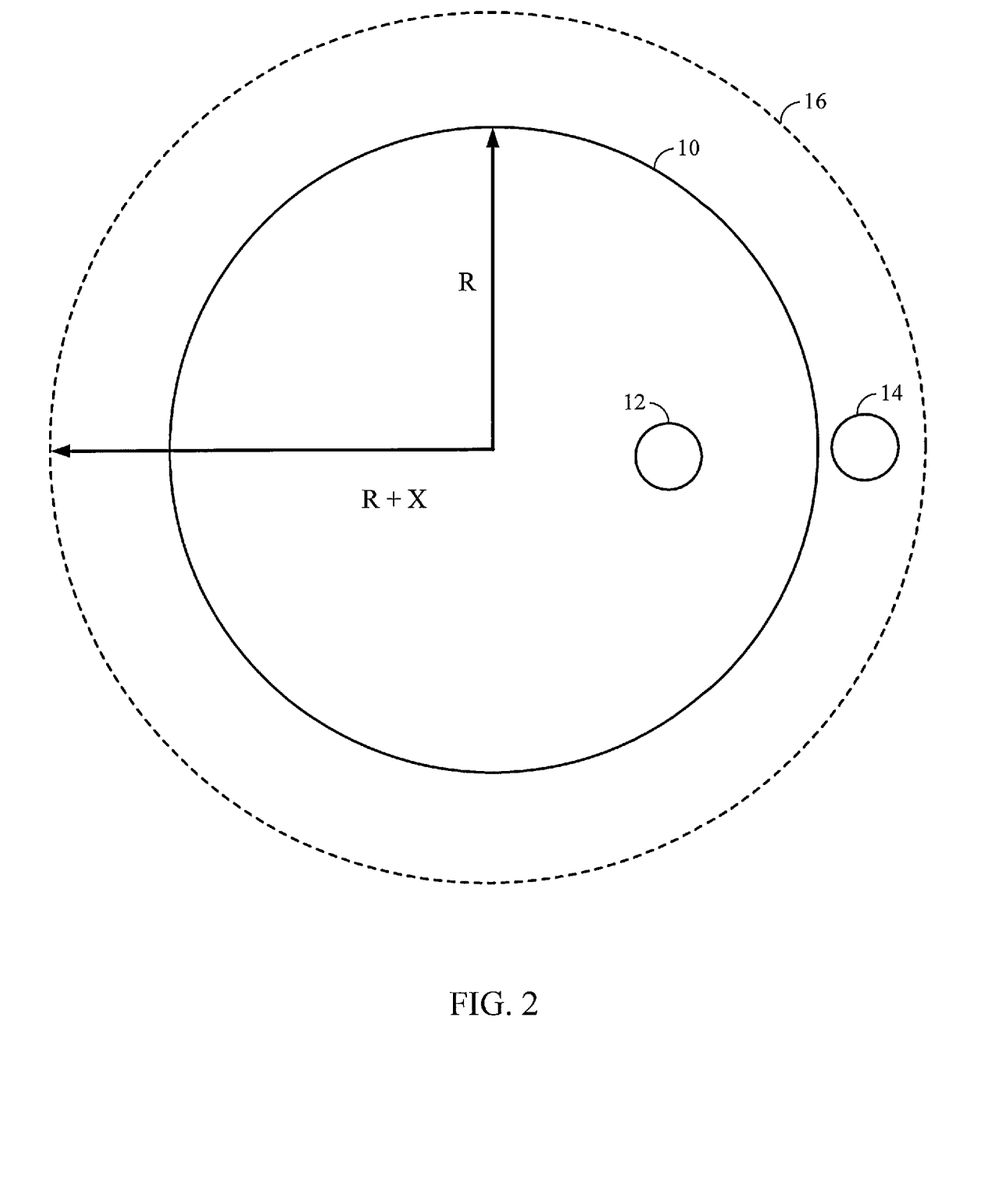
FIG. 2 is a diagram illustrating alteration of a geofence according to an embodiment.

FIG. 1 considers a scenario where a geofence 10 is in the shape of a circle. Location 14 represents a location of an object outside the geofence. Location 12 represents a location of an object inside the geofence 10. If the object crosses the boundary of the geofence to initiate a "breach" event, an alert, such as a report or an alarm, may be generated. Such an alert may be generated each time the object crosses the geofence. In certain cases, such alerts may be desirable, for instance where breach of a geofenced area may indicate a high security breach or grave danger. At other times, however, such alerts may be unnecessarily burdensome to an entity monitoring the alerts. Here, a precision or accuracy of a tracked location of a device being monitored may be less critical. Where a geofence is being administered by a mobile device, for example carried by a user or user vehicle, frequent breach reports may drain the battery of the mobile device in a location where recharging or replacing the battery is inconvenient or impossible.

Where repeated alerts are deemed burdensome, an initial alert in response to detection of an object crossing the geofence 10, moving from location 14 to location 12, may trigger alteration of geofence 10. Such an alteration may reduce a frequency of alerts and allow freer movement of the object near or around a perimeter of geofence 10 without triggering breach reports. For instance, geofence 10 may be expanded. In one particular implementation, such an expansion may include increasing a radius of a substantially circular geofence from 'R' to 'R+X' shown at dotted circle 16 in FIG. 2. Since both locations 12 and 14 are enclosed by the altered geofence shown at dashed circle 16, less frequent alerts may be expected from motion of the object, if motion of the object continues to be in the vicinity of the previously detected locations 12 and 14.

Figure 3:
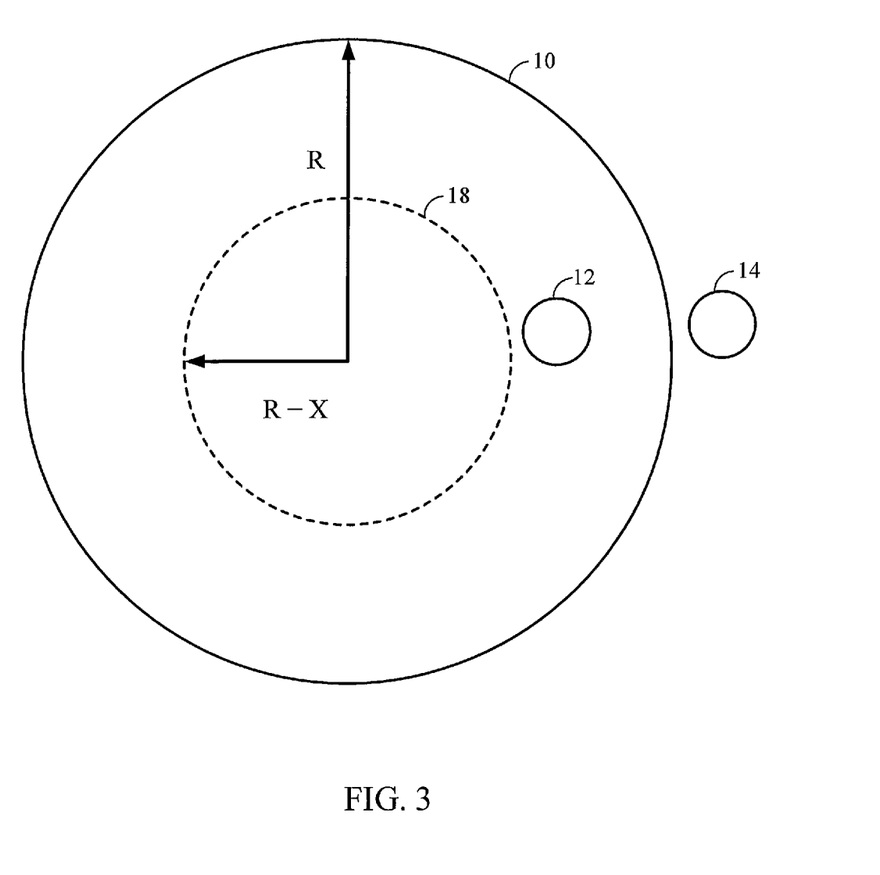
FIG. 3 is a diagram illustrating alteration of a geofence according to an alternative embodiment.

Referring again to FIG. 1 in another scenario, an object at location 12 may escape an area bounded by a geofence to arrive at location 14. Here, if the object is moving along the boundary of the geofence, crisscrossing the boundary line frequently, it may similarly trigger or initiate frequent alerts. As shown in FIG. 3, once the object is detected moving from location 12 to location 14, the radius of the geofence may be decreased to 'R−X' to a new geofence 18 represented by a dashed circle representing a new geofence. Since both locations 12 and 14 are outside the new geofence 18, position less frequent alerts may be expected so long as the object continues to travel in the vicinity of locations 12 and 14.

Figure 4A:
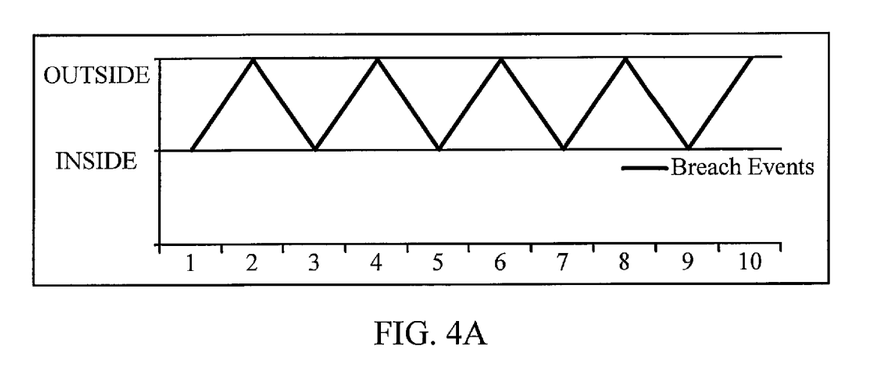
FIGS. 4A and 4B are timing diagrams illustrating timing of breach events according to an embodiment.
Figure 4B:
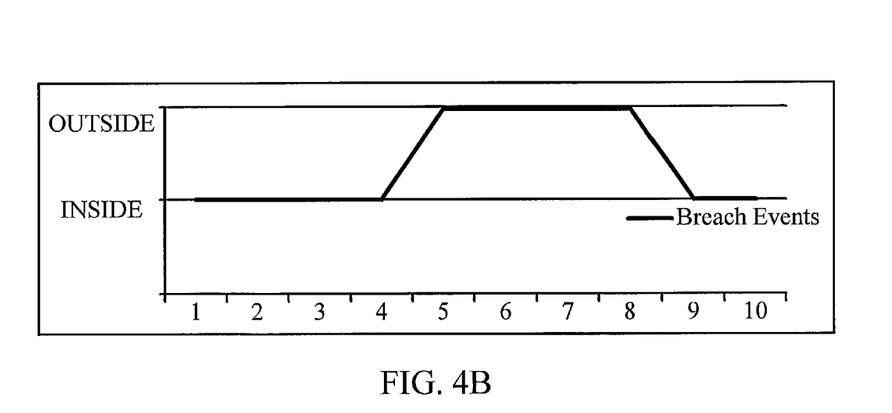

FIGS. 4A and 4B are timing diagrams illustrating breach events in a particular implementation. At FIG. 4A, a geofence remains static as an object that is being tracked frequently enters and then exits the geofence, triggering a breach event at each instance that the object enters and then exits an area bounded by the geofence. In the embodiment of FIG. 4B, on the other hand, a geofence is temporarily altered following an exit of an object being tracked from an area bounded by the geofence. In this particular example, a geofence may be temporarily reduced in size (e.g., by reducing a radius of a particular geofence that is circular) to reduce the frequency of breach events.

In particular implementations, values for "R", "X", or "T" may be fine-tuned for particular applications depending on various factors, such as accuracy of position detection, criticality of the location of the geofence, anticipated motion of the object, and identification of the object as friend or foe.

In particular embodiments, a hierarchy of concentric geofences, of increasing alert levels may be implemented where a decision of whether to alter the boundary may depend, at least in part, on which level of geofence has been breached. In other embodiments, detection of a proximity of an object being tracked to a geofence, rather than an actual breach may indicate a condition for initiating an alteration of the geofence. A second, concentric geofence may signal a vicinity of a geofence that is to be expanded, or contracted.

Figure 5:
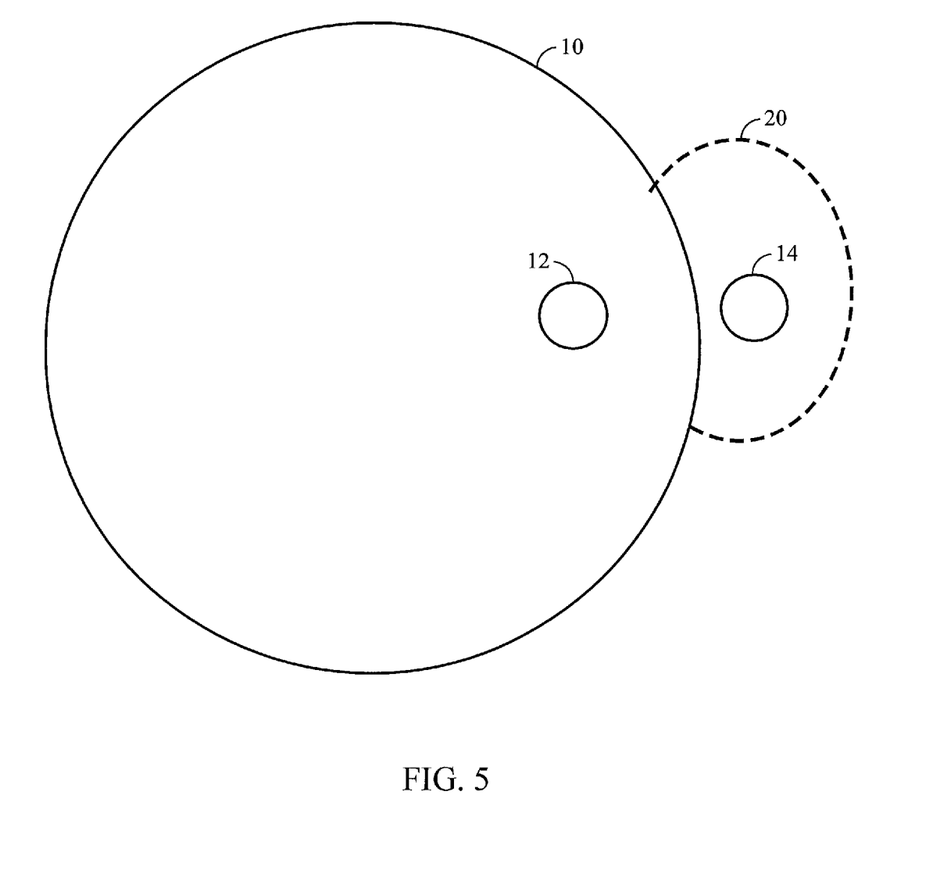
FIG. 5 is a diagram illustrating alteration of a geofence according to yet another alternative embodiment.

FIG. 5 illustrates an embodiment of an alteration to a geofence. According to an alternative implementation, a mobile device is detected at locations 12 and/or 14 as crossing and/or moving in a vicinity of a boundary of a geofence 10. In response, a shape of the geofence 10 is altered, as shown with expansion 20. It should be understood, however, that this is merely an example of an expansion of a geofence and claimed subject matter is not limited in this respect.

A breach of a geofence (by either a mobile device entering or exiting a region bounded by a geofence) may be detected based, at least in part, on mapping an estimated or tracked location of the mobile device onto an area. Here, the mobile device may have a positioning engine with capabilities of estimating or tracking a position of the mobile device based, at least in part, on wireless signals acquired at a receiver. Such acquired signals may be transmitted from a satellite positioning system (SPS) or from terrestrial transmitters using any one of several known positioning techniques. In other implementations, a mobile device may track its position using indoor navigation techniques such as, for example, obtaining range measurements to transmitters positioned at known locations (e.g., by measuring received signal strength or round-trip time) or processing signals generated from on-board inertial sensors (e.g., gyroscope, accelerometers, magnetometer, etc.). In other implementations, a positioning engine of a mobile device may incorporate measurements from multiple sources including for example, inertial sensors, acquisition of SPS signals, and acquisition of signals in an indoor environment, just to provide a few examples.

Figure 6:
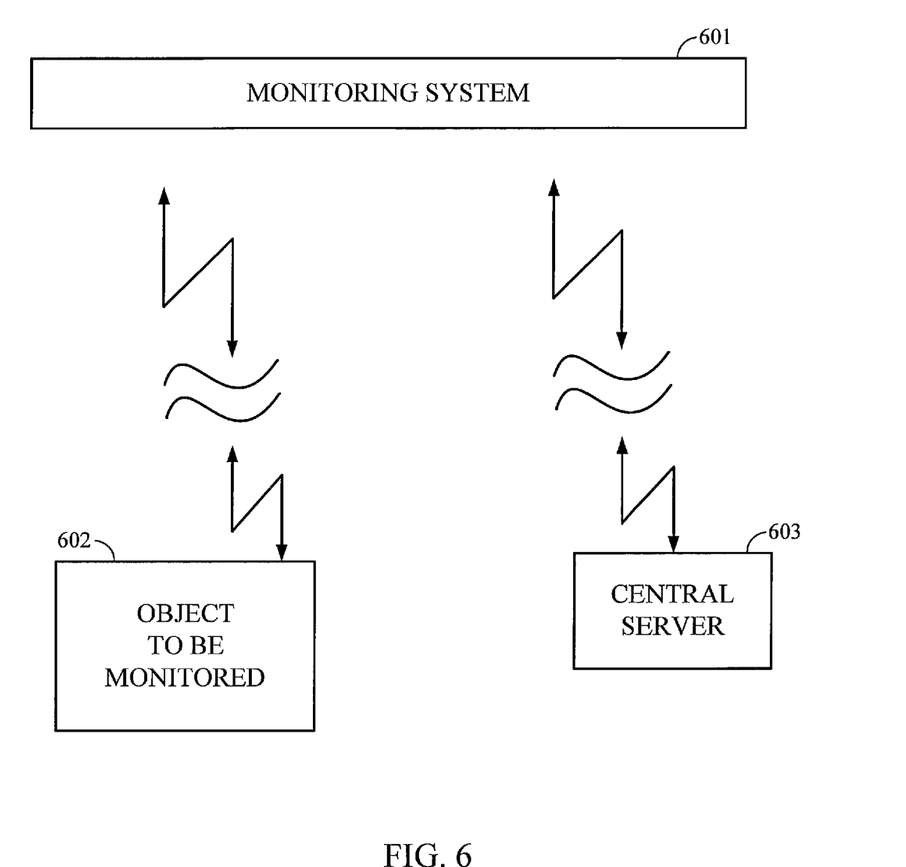
FIG. 6 is a schematic diagram of a system to implement a geofence according to an embodiment.

In particular implementations, a mobile device may track its position (e.g., by acquiring signals from an SPS or terrestrial transmitters, processing signals from inertial sensors, etc. as mentioned above) and host an application to apply the tracked position to a geofence. In an alternative implementation illustrated in FIG. 6, a monitoring system 601 may monitor an object 602 that does not have a capability tracking its own location. A monitoring system 601 may report estimated locations of object 602 or a computed trajectory of object 602 to a central server 603. Locations of object 602 may be estimated or tracked based, at least in part, on measurements or detections obtained from remote sensors using techniques such as, for example, radar, video, infrared imaging or sonar. Central server 603 may then implement geofence management responsive to the monitoring. Remote geofence management may be useful for a user remote from the object 602, for instance a manager supervising a sales force, an emergency dispatcher, or security personnel charged with surveillance.

Flow diagrams discussed herein are not intended to limit the location or implementation of operations or devices, and in no way are intended to limit claimed subject matter. Thus boxes of a single diagram chart may occur in the same or different devices. A single box may be distributed over more than one device.

Figure 7A:
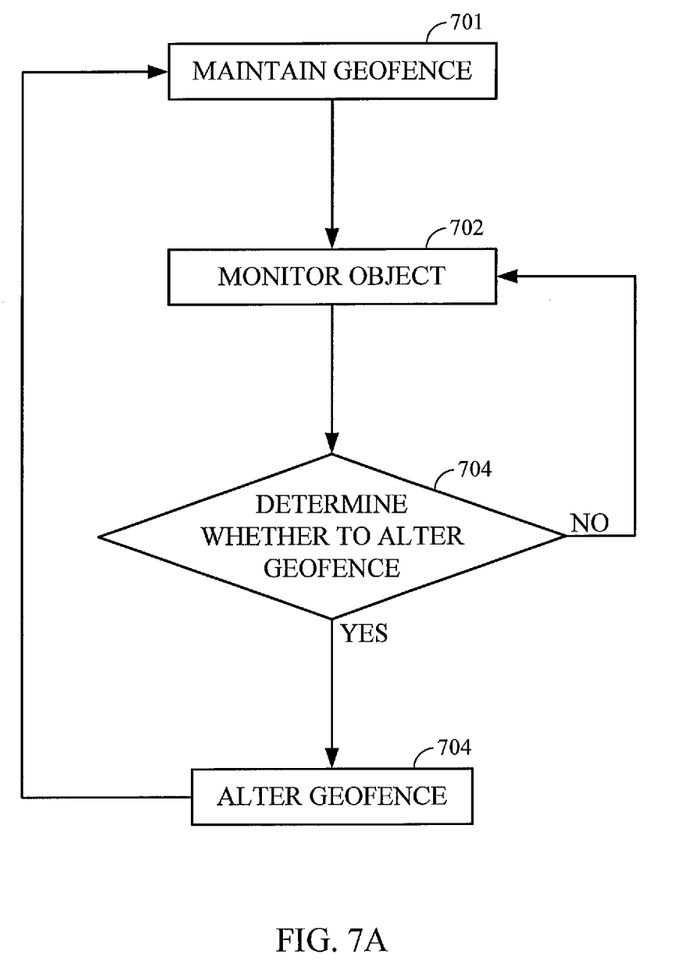
FIG. 7A is a flow diagram of a process to alter a geofence according to an embodiment.

7A is a flowchart of a process in accordance with an embodiment. At block 701, a geofence may be maintained according to a predefined size, shape and/or location. As indicated above, a geofence maintained at block 701 may comprise any particular shape or dimension (e.g., circle, ellipse, polygon, etc.). In one example, block 701 may maintain a geofence as a set of possible locations of a mobile device that are inside of or outside of a boundary defining the geofence. In alternative implementations, a geofence boundary may be defined as a discrete set of areas inside of a boundary and a set of areas bordering the geofence boundary. At block 702, a location of an object (e.g., mobile device) may be monitored. In one particular implementation, one or more positioning technologies may be used for obtaining continuous or periodic updates of an estimated location of an object that is being tracked (e.g., acquisition of SPS signals, acquisition of signals transmitted by terrestrial transmitters, processing of signals from inertial sensors, etc.). Continuous or periodic updates of an estimated position may then be compared with a geofence.

As discussed above, in one particular implementation, a size or shape of a geofence may be temporarily altered at block 704 for a duration of time (e.g., temporarily expanding the geofence if a tracked object enters the geofence and temporarily contracting the geofence if the tracked object leaves the geofence). As pointed out above, this may reduce an incidence of extraneous breach events that may reduce battery life.

In particular implementations, at diamond 703 any one of several criteria may be evaluated in determining whether a geofence may be altered (e.g., altering size or shape of the geofence). One possible criterion may comprise a risk level associated with an object or device being monitored. For instance, if an ordinary vehicle is approaching a chemical spill or fire, it may be desirable to apply a conservative policy in alerting the vehicle operator to stay away from that hazard. In this situation, frequent alerts may be desirable.

In another implementation, a geofence may be assigned or associated with a priority. For example, there may be a greater tendency or desire to alter a lower priority geofence to reduce breach reports while tolerating more frequent breach reports from a high priority geofence. For instance, in a traffic monitoring system, it may be desired to alert a driver only once if approaching an area of slow traffic, but alert the driver more frequently if the driver is approaching a road that is actually closed. Similarly, in an intrusion detection system, it may be desired to assign different priorities based, at least in part, on a particular location of a geofence or time of day. Multiple concentric geofences may enclose a hazardous location where different priorities are associated with different concentric geofences based, at least in part, on proximity to the hazardous location.

Other possible criteria might include a number of crossings or approaches or the speed of approach by a device or object being tracked. It may be desirable to wait until a threshold number of crossings of the geofence is reached. Alternatively if the device or object being tracked approaches very quickly, the geofence may be altered sooner than if the object is approaching slowly.

In other implementations, a user may establish criteria under which a geofence is to be altered. This may depend on the tolerance the user has for frequent reports or the willingness of the user to frequently charge the battery on the user's mobile device.

Figure 7B:
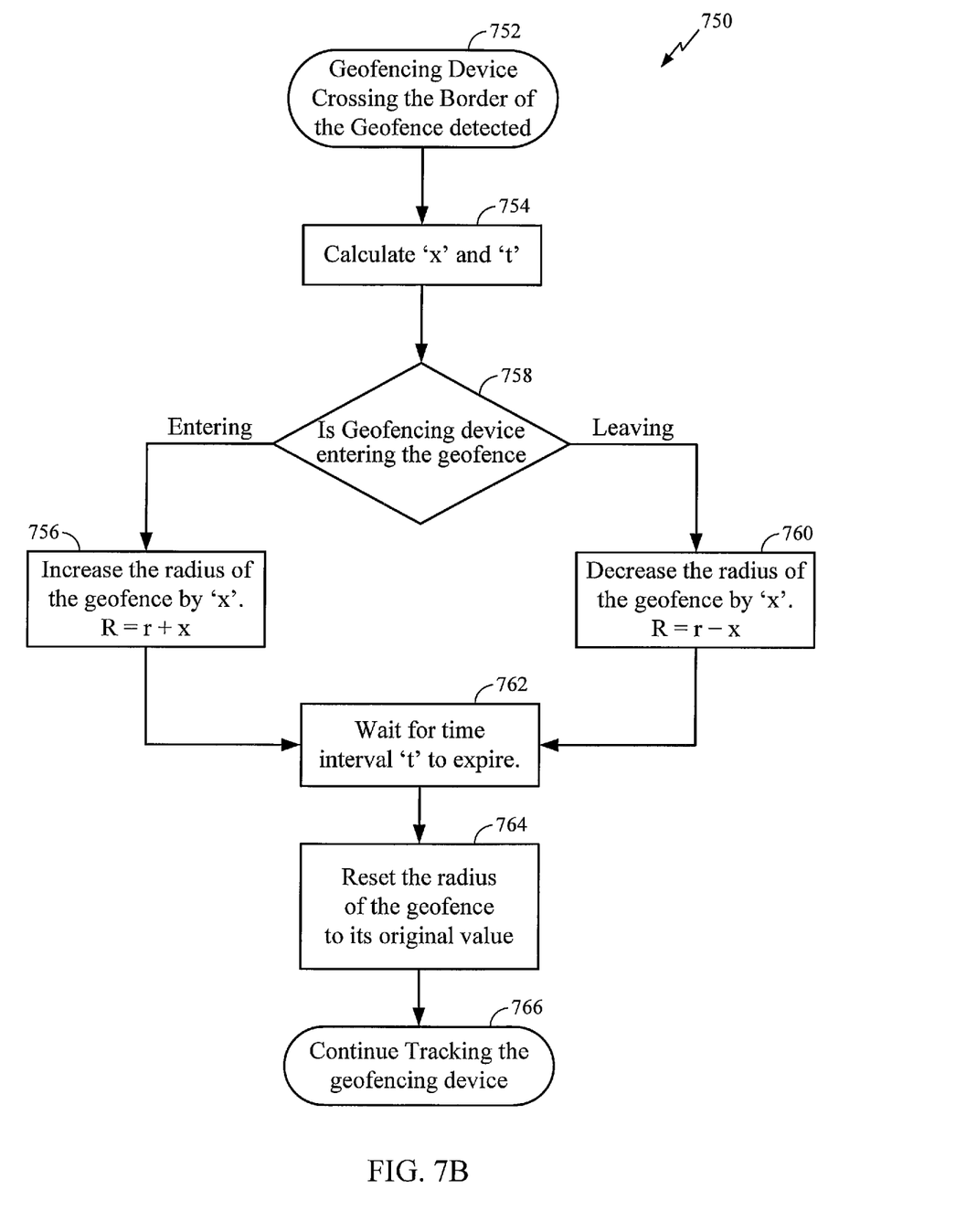
FIG. 7B a flow diagram of a process to later a geofence according to an alternative embodiment.

FIG. 7B is a flow diagram illustrating a process temporarily altering a geofence according to an embodiment. In this particular example, a radius of a circular geofence is temporarily increased or decreased depending on whether a breach of the geofence was an entry into or an exit out of an area bounded by the geofence. It should be understood, however, that this is merely an example process of temporarily altering a geofence and claimed subject matter is not limited in this respect. At 752, a geofence breach is detected by, for example, comparing an updated estimate of a location of an object with an area defined by the geofence. Block 754 may determine an extent to which a geofence is to be altered and a duration "t" that the geofence is to the altered from its original state. In this particular example, "x" represents an amount that a radius of the geofence is to be temporarily increased or decreased.

Any one of several factors may be considered or evaluated in determining values for t or x. For example, a value for x may be determined based, at least in part, on a perceived accuracy (e.g., expected error) of a position fix indicating a breach of a geofence boundary. A value for t may be determined based, at least in part, on user-defined settings indicating how much time movement may be ignored, in addition to an estimated speed of a tracked object. If a tracked object is perceived to be slower-moving, a value for t may be increased. Likewise, if a tracked object is perceived to be faster-moving, a value for t may be decreased.

Diamond 758 determines whether an object being tracked enters or exits a geofence. In one implementation, a location of the object may be tracked with a series of continuous or discrete location estimates. For example, a location estimate inside of the geofence followed by a location estimate outside of the geofence may indicate that the object has exited the geofence boundary. Likewise, a location estimate outside of the geofence followed by a location estimate inside of the geofence may indicate that the object has entered the geofence boundary. If diamond 758 determines that the object is leaving or has left the area bounded by the geofence, block 760 may decrease the radius of the geofenced boundary by an x amount. Similarly, if diamond 758 determines that the object is entering or has entered the area bounded by the geofence, block 756 may increase the radius of the geofenced boundary by an x amount.

In the particular implementation shown in FIG. 7B, the same value of x and value of t is applied to temporarily alter the geofence alter regardless of whether the tracked object is entering or leaving the area bounded by the geofence. In other embodiments, different values for x and t may be computed depending, at least in part, on whether the object is entering or leaving.

At block 762, a geofence is maintained in an altered state (e.g., with an increased or decreased radius) until time duration t expires. The altered geofence may then be reset to return to its original, unaltered state at block 764 in response to expiration of time duration t. Tracking of the object may then continue at 766. In an alternative implementation, instead of entirely restoring the radius of a circular geofence to R=r all at once on expiration of time interval t as illustrated at blocks 762 and 764, process 750 may gradually restore the radius R=r over time. Here, time interval t may be partitioned into contiguous and non-overlapping epochs. If a size of radius R is increased over its original size by 10% at block 756, for example, radius R may be increased by only 7.5% of its original size following a first epoch, by only 5% of its original size following a second epoch, by only 2.5% of its original size following a third epoch, and finally returned to its original size r following a fourth epoch. Similarly, if a size of radius R is decreased from its original size by 10% at block 760, for example, radius R may be decreased by only 7.5% of its original size following a first epoch, by only 5% of its original size following a second epoch, by only 2.5% of its original size following a third epoch, and finally returned to its original size r following a fourth epoch.

Implementations described above are directed to altering a size or shape of a geofence boundary in response to detection of a transition between an interior and exterior of the geofence boundary. In an alternative implementation, instead of altering a size or shape of a geofence, other threshold conditions may be imposed for detecting a breach stemming from a transition between an interior and exterior of a geofence boundary while maintaining the size and shape of the geofence boundary static. For example, a breach stemming from a transition from an interior of a geofence boundary to an exterior of the geofence boundary may be detected following or in response to a threshold time that a tracked object is determined to be located in the exterior, or a threshold number of consecutive position fixes in the exterior. Likewise, a breach stemming from a transition from an exterior of a geofence boundary to an interior of the geofence boundary may be detected following or in response to a threshold duration that a tracked object is determined to be located in the interior, or a threshold number of consecutive position fixes in the interior. In yet another alternative implementation, a size or shape of a geofence boundary may be altered as discussed above (e.g., increased in size) in response to a breach detected by a threshold duration that a tracked object is determined to be located in the interior or a number of consecutive position fixes located in the interior. Likewise, a size or shape of a geofence boundary may be altered (e.g., decreased in size) in response to breach detected by a threshold duration that a tracked object is determined to be located in the exterior or number of consecutive position fixes located in the exterior.

Figure 8:
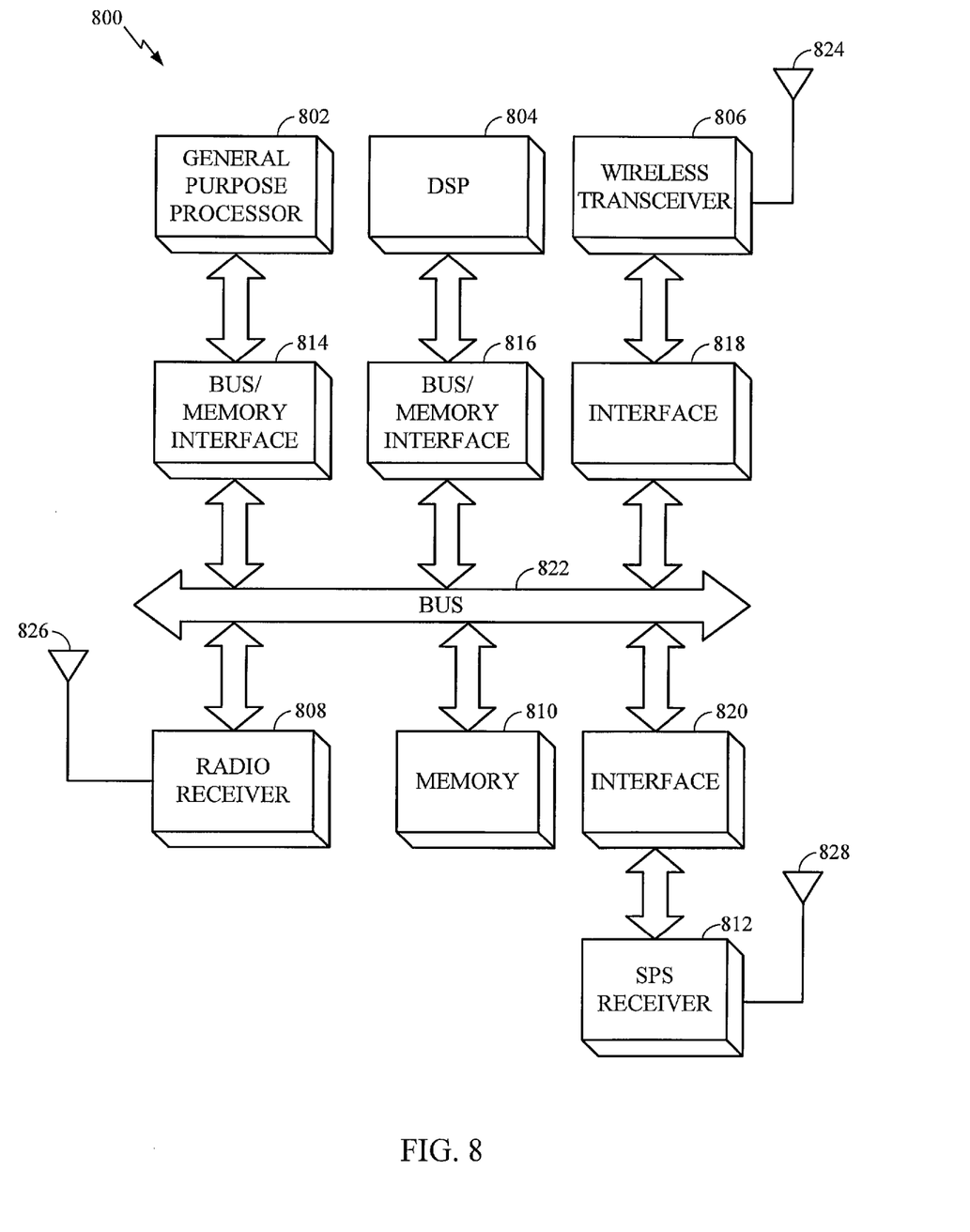
FIG. 8 is a schematic diagram of a mobile device according to an embodiment.

As illustrated in FIG. 8 according to a particular implementation, a mobile device architecture 800 may include, for example, a general purpose processor 802, a digital signal processor 804, a wireless transceiver 806, a radio receiver 808, a memory 810, and an SPS receiver 812. A bus 822 or other alternative structure or structures may be provided for establishing interconnections between various components of mobile device architecture 800. In the illustrated implementation, one or more interfaces 814, 816, 818, 820 may be provided between selected components and bus 822. The wireless transceiver 806, the radio receiver 808, and the SPS receiver 812 may each be coupled to one or more antennas 824, 826, 828, and/or other transducers, to facilitate the transmission and/or reception of wireless signals.

The general purpose processor 802 and the digital signal processor 804 are digital processing devices that are capable of executing programs to provide one or more functions and/or services to a user. One or both of these processors 802, 804 may be used, for example, to execute an operating system of a corresponding wireless device. One or both of these processors 802, 804 may also be used, for example, to execute user application programs including, for example, location-based applications that may rely on the availability of an accurate position estimate. In addition, one or both of these processors 802, 804 may be used to implement, either partially or fully, one or more of the positioning related processes or techniques described herein in some implementations. It should be appreciated that other forms of digital processing devices may additionally or alternatively be used to perform some or all of the described functions in various implementations including, for example, one or more controllers, microcontrollers, application specific integrated circuits (ASICs), field programmable gate arrays (FPGAs), programmable logic arrays (PLAs), programmable logic devices (PLDs), reduced instruction set computers (RISCs), and/or others, including combinations of the above.

Wireless transceiver 806 may include any type of transceiver that is capable of supporting wireless communication with one or more remote wireless entities. In various implementations, wireless transceiver 806 may be configured in accordance with one or more wireless networking standards and/or wireless cellular standards. In some implementations, multiple wireless transceivers may be provided to support operation with different networks or systems in a surrounding environment. During mobile device operation, wireless transceiver 806 may be called upon to communicate with a base station or access point of a wireless communication system or network. Radio receiver 808 may be operative for receiving signals from one or more sensors of a sensor network or other transmitting nodes within a surrounding environment.

Memory 810 may include any type of device or component, or combination of devices and/or components that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

SPS receiver 812 may include any type of receiver capable of receiving SPS signals from positioning satellites and processing the signals to provide one or more position estimates for a mobile device. SPS receiver 812 may be configured to operate with any existing or future SPS system including, for example, the Global Positioning System (GPS), the GLONASS system, the Compass system, the Galileo system, the IRNSS system, the GNSS system and other systems that use Satellite Based Augmentation Systems (SBASs) and/or Ground Based Augmentations Systems (GBASs), and/or other satellite navigation systems. In some implementations, one or more of the processes or techniques described herein may be implemented, either partially or fully, within SPS receiver 812 or a similar structure.

In particular implementations, an SPS includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting space vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. Furthermore, such techniques may be used with positioning systems that utilize terrestrial transmitters acting as "pseudolites", or a combination of SVs and such terrestrial transmitters.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, acceleration, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

The word "a" or "an" as used in the claims should not be read as precluding more than one of the thus recited elements. The word "comprising" is used herein synonymously with the word "including."

The claims and specification herein may include anthropomorphic or algorithmic language, Nevertheless there is no intent here to claim human mental or manual operations. All claimed operations are intended to occur in automated fashion in one or more apparatuses.

What is claimed is:

1. A method comprising:
   detecting a breach of a geofence in response to detection that a mobile device has entered or exited a region bounded by the geofence;
   temporarily expanding or contracting said region bounded by said geofence from an initial state in response to said detection of said breach for a set duration starting at said detection; and
   returning said geofence to said initial state responsive to expiration of said set duration.

2. The method of claim 1, wherein said initial state is characterized by a size of an area bounded by the geofence.

3. The method of claim 2, wherein said geofence comprises a circular geofence, and wherein temporarily expanding or contracting said region bounded by said geofence comprises changing a radius of said circular geofence.

4. The method of claim 3, wherein temporarily expanding or contracting said region bounded by said geofence comprises temporarily increasing the radius of said circular geofence in response to detecting that said mobile device has entered an area bounded by said geofence.

5. The method of claim 3, wherein temporarily expanding or contracting said region bounded by said geofence comprises temporarily decreasing the radius of said circular geofence in response to detecting that said mobile device has exited an area bounded by said geofence.

6. The method of claim 1, wherein said geofence comprises a polygonal shape.

7. The method of claim 1, wherein detecting the breach further comprises:
   obtaining a trajectory of said mobile device; and
   determining whether the mobile device has entered or exited the geofence in response to determining that said trajectory crosses the geofence.

8. The method of claim 7, and further comprising computing said trajectory based, at least in part, on a sequence of two or more estimates of a location of said mobile device.

9. The method of claim 7, and further comprising computing said trajectory based, at least in part, on measurements obtained from one or more inertial sensors on-board said mobile device.

10. The method of claim 1, wherein returning said geofence to said initial state responsive to expiration of said set duration comprises returning said geofence to said initial state over increments within said set duration.

11. A mobile device comprising: a receiver to acquire wireless signals; and a processor to:
   detect a breach of a geofence in response to detection that the mobile device has entered or exited a region bounded by the geofence based, at least in part, on said acquired signals;
   temporarily expand or contract said region bounded by said geofence from an initial state in response to said detection of said breach for a set duration starting at said detection; and
   return said geofence to said initial state responsive to expiration of said set duration.

12. The mobile device of claim 11, wherein said initial state is characterized by a size of an area bounded by the geofence.

13. The mobile device of claim 12, wherein said geofence comprises a circular geofence, and wherein said geofence is temporarily expanded or contracted by changing a radius of said circular geofence.

14. The mobile device of claim 13, wherein said region bounded by said geofence is temporarily expanded by temporarily increasing the radius of said circular geofence in response to detecting that said mobile device has entered an area bounded by said geofence.

15. The mobile device of claim 13, wherein said region bounded by said geofence is temporarily contracted by temporarily decreasing the radius of said circular geofence in response to detecting that said mobile device has exited an area bounded by said geofence.

16. The mobile device of claim 11, wherein said geofence comprises a polygonal shape.

17. The mobile device of claim 11, wherein the breach is detected by:
   obtaining a trajectory of said mobile device; and
   determining whether the mobile device has entered or exited the geofence in response to determining that said trajectory crosses the geofence.

18. The mobile device of claim 17, wherein said processor is further configured to compute said trajectory based, at least in part, on a sequence of two or more estimates of a location of said mobile device.

19. The mobile device of claim 17, wherein said processor is further configured to compute said trajectory based, at least in part, on measurements obtained from one or more inertial sensors on-board said mobile device.

20. The mobile device of claim 11, wherein said geofence is returned to said initial state responsive to expiration of said set duration by returning said geofence to said initial state over increments within said set duration.

21. An article comprising: a non-transitory storage medium comprising machine-readable instructions stored thereon which are executable by a special purpose computing apparatus to:
   detect a breach of a geofence in response to detection that the mobile device has entered or exited a region bounded by the geofence;
   temporarily expand or contract said region bounded by said geofence from an initial state in response to said detection of said breach for a set duration starting at said detection; and
   return said geofence to said initial state responsive to expiration of said set duration.

22. The article of claim 21, wherein said initial state is characterized by a size of an area bounded by the geofence, and wherein said geofence comprises a circular geofence, and wherein said region bounded by said geofence is temporarily expanded or contracted by changing a radius of said circular geofence.

23. The article of claim 22, wherein said region bounded by said geofence is temporarily expanded by temporarily increasing the radius of said circular geofence in response to detecting that said mobile device has entered an area bounded by said geofence.

24. The article of claim 21, wherein said region bounded by said geofence is temporarily contracted by temporarily decreasing the radius of said circular geofence in response to detecting that said mobile device has exited an area bounded by said geofence.

25. An apparatus comprising:
   means for detecting a breach of a geofence in response to detection that a mobile device has entered or exited a region bounded by the geofence;
   means for temporarily expanding or contracting a region bounded by said geofence from an initial state in response to said detection of said breach for a set duration starting at said detection; and
   means for returning said geofence to said initial state responsive to expiration of said set duration.

26. The apparatus of claim 25, wherein said means for detecting the breach further comprises:
   means for obtaining a trajectory of said mobile device; and
   means for determining whether the mobile device has entered or exited the geofence in response to determining that said trajectory crosses the geofence.

27. The apparatus of claim 26, and further comprising means for computing said trajectory based, at least in part, on a sequence of two or more estimates of a location of said mobile device.

28. The apparatus of claim 26, and further comprising means for computing said trajectory based, at least in part, on measurements obtained from one or more inertial sensors on-board said mobile device.

* * * * *

UNITED STATES PATENT AND TRADEMARK OFFICE
CERTIFICATE OF CORRECTION

| | | |
|---|---|---|
| PATENT NO. | : 8,941,489 B2 | Page 1 of 1 |
| APPLICATION NO. | : 13/529782 | |
| DATED | : January 27, 2015 | |
| INVENTOR(S) | : Suhas H. Sheshadri, Aditya N. Srivastava and Opshaug Guttorm | |

It is certified that error appears in the above-identified patent and that said Letters Patent is hereby corrected as shown below:

On the title page, item (72) Inventor Sheshadri; Suhas H. (Santa Clara, CA), Srivastava; Aditya N. (San Diego, CA)

Replace with:

(72) Inventor Sheshadri; Suhas H. (Santa Clara, CA), Srivastava; Aditya N. (San Diego, CA), Guttorm; Opshaug (Redwood City, CA)

Signed and Sealed this
Twenty-second Day of March, 2016

Michelle K. Lee
*Director of the United States Patent and Trademark Office*